United States Patent [19]

Graves

[11] Patent Number: 4,614,122

[45] Date of Patent: Sep. 30, 1986

[54] FLUID FLOW DETECTOR WITH ADAPTOR

[75] Inventor: Brian J. Graves, Lincoln, Nebr.

[73] Assignee: Emhart Industries, Inc., Indianapolis, Ind.

[21] Appl. No.: 829,718

[22] Filed: Feb. 3, 1986

Related U.S. Application Data

[63] Continuation of Ser. No. 688,026, Dec. 31, 1984, abandoned.

[51] Int. Cl.[4] .......................... G01F 1/28; G01F 15/18

[52] U.S. Cl. ............................... 73/861.74; 73/272 R; 200/81.9 R

[58] Field of Search ........... 73/861.71, 861.74, 861.75, 73/861.76, 861.79, 861.87, 861.92, 861.83, 198, 272 R; 138/92, 94; 200/81.9 R, 81.9 M

[56] References Cited

U.S. PATENT DOCUMENTS

| | | | |
|---|---|---|---|
| 2,203,331 | 6/1940 | Hinsch | 208/81.9 M |
| 2,347,830 | 5/1944 | Kiburz et al. | 73/861.74 |
| 3,380,302 | 4/1968 | Gelinas | 73/861.75 |
| 3,845,259 | 10/1974 | Spurr | 73/861.76 |
| 4,282,413 | 4/1981 | Simons et al. | 340/610 |

*Primary Examiner*—Herbert Goldstein
*Attorney, Agent, or Firm*—Robert F. Meyer

[57] ABSTRACT

The saddle of a fluid flow detector is held in sealing relation to a conduit through an adapter. The adapter has an aperture that mates with an aperture in the conduit through which the actuator of the detector extends. The adapter is fabricated of a suitable plastic. In another embodiment, a bracket holds the saddle in a sealing relation to the conduit.

2 Claims, 4 Drawing Figures

FLUID FLOW DETECTOR WITH ADAPTOR

This application is a continuation of application Ser. No. 688,026, filed Dec. 31, 1984, now abandoned.

SUMMARY OF THE INVENTION

The present invention relates to a mechanism for detecting flow in a fluid carrying conduit which, in general, comprises a saddle adapted for securement to the conduit in overlying relationship to an opening to the conduit, an adapter plate for providing a sealing relation between the saddle and the conduit and flow detecting means adapted for insertion in the conduit and shiftable in response to fluid flow therethrough including a reactor member extending into the saddle.

BACKGROUND OF THE INVENTION

The present invention pertains to a flow detecting mechanism and, more particularly, to a flow detecting mechanism useful for operating other mechanisms such as a switch.

Flow detecting mechanisms of the type referred to have many varied applications for sensing and controlling flow in fluid carrying apparatus as well as operating associated structure in response to the presence or absence of fluid flow. Many such mechanisms now available sense fluid flow by movement of a vane or like detector disposed in a fluid carrying conduit. Physical movement of the detector is accomplished either directly by fluid flow impinging thereon or by use of structure such as orifices, blades or turbines in the conduit that creates a pressure differential which causes shifting of the detector. This physical movement must then be transmitted externally of the conduit to operate a switch, usually electrical, to indicate the presence of flow.

A typical example of such flow detecting mechanisms is that described in U.S. Pat. No. 4,454,768 issued June 19, 1984. As is typical of such devices described in this patent, the housing or saddle which carries the actuator means is secured directly to the fluid carrying conduit at an opening in the wall of the conduit. Naturally, the connection must be made in a tight sealing relationship.

OBJECTS OR FEATURES OF THE INVENTION

Accordingly, it is a feature of the present invention to provide a fluid flow detector assembly wherein the saddle of the assembly is secured to a conduit through an adapter. Another feature of the invention is the provision of such an assembly wherein the saddle includes boss means adapted to engage the conduit at its opening.

These and other features of the invention will become apparent from the following description taken in conjunction with the accompanying drawings.

DETAILED DESCRIPTION OF THE DRAWINGS

Figure 1:
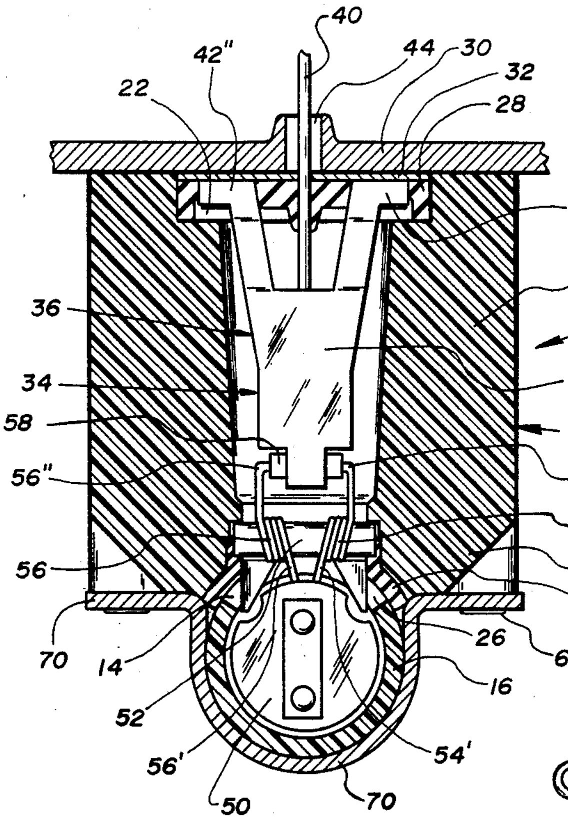
FIG. 1 is a side view taken in section showing a flow detecting mechanism employing the features of the invention in combination with a conduit through which a fluid may flow.

Referring now to the drawings, there is shown a flow detecting mechanism 10 which is enclosed in a housing or saddle 12 that is adapted to be connected to an opening 14 of conduit 16. The saddle 12 is comprised of a cup-shaped member 20 having an open end 22 and a base 24 having opening 26 therein. The opening 22 is closed by a resilient member 28 which forms a tight seal with the housing. A rigid plate 30 holds seal 28 and backup plate 32 in place.

A flow detection means 34 responds to fluid flow in conduit 16. Detecting means 34 includes a reactor member 36 and an actuator means 38. Reactor member 36 includes a shaft 40 and a rigid arm 42 which is fixed to the shaft. Shaft 40 extends through apertures 44 of plate 30 and 46 of backup plate 32 and is held in a seal tight relation with resilient member 28. Shaft 40 is made to pivot about point 48 through the pivoting of the distal ends 42' and 42" engaging grooves in backup plate 32.

Actuator means 38 includes a paddle 50 that is carried in conduit 16 and is pivotally mounted on pin 52 through coil springs 54 and 56. More specifically, the distal ends 54' and 56' are connected to the paddle 50. The reactor member and the actuator means are pivotally connected together through the other ends 54" and 56" being connected to or engaged with a sleeve 58 carried on the arm 42 of the reactor member.

Figure 3:
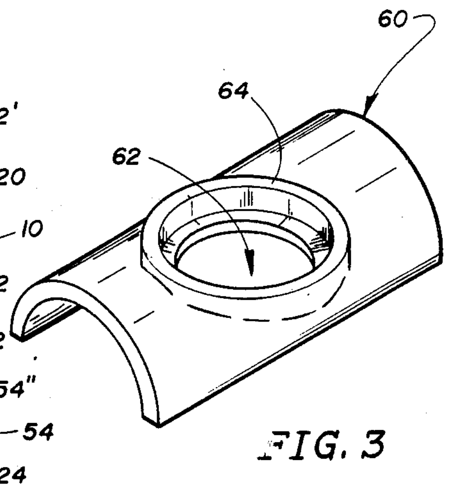
FIG. 3 is an isometric view of an adapter.
Figure 4:
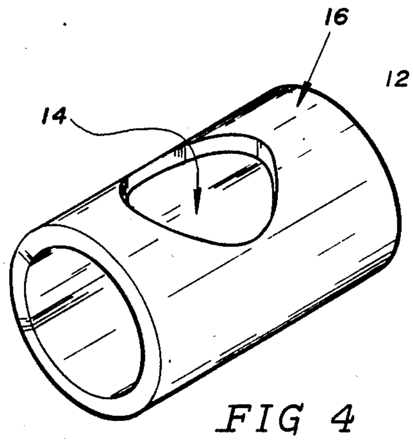
FIG. 4 is an isometric view of a conduit to which the fluid detector assembly is connected.

In accordance with the present invention, saddle 12 is held in a sealing tight relationship through an adapter 60 which is fabricated from an elastomer that is substantially impervious to water. As best shown in FIGS. 3 and 4, the adapter, in the illustrative embodiment, is a semi-circular plate that is shaped to fit conduit 14 for which it is being used. The adapter includes an aperture 62 which is placed in line with opening 14 of conduit 16. In order to further provide a tight seal around the opening, the adapter further includes a boss 64 surrounding aperture 62. As shown in FIG. 1, the adapted is squeezed between the conduit and the saddle by having a plurality of bolts 66 or other fastening means connect the saddle to a bracket 70 which extends around the conduit where the flow detector is to be located.

A further seal is also provided by boss means 76 extending from saddle 12. Boss means 76 includes two sets of oppositely disposed fingers 72 and 74 which carries pin 52. When pin 52 is inserted between the fingers they are forced apart to provide a tight fit between the fingers and conduit 16.

Figure 2:
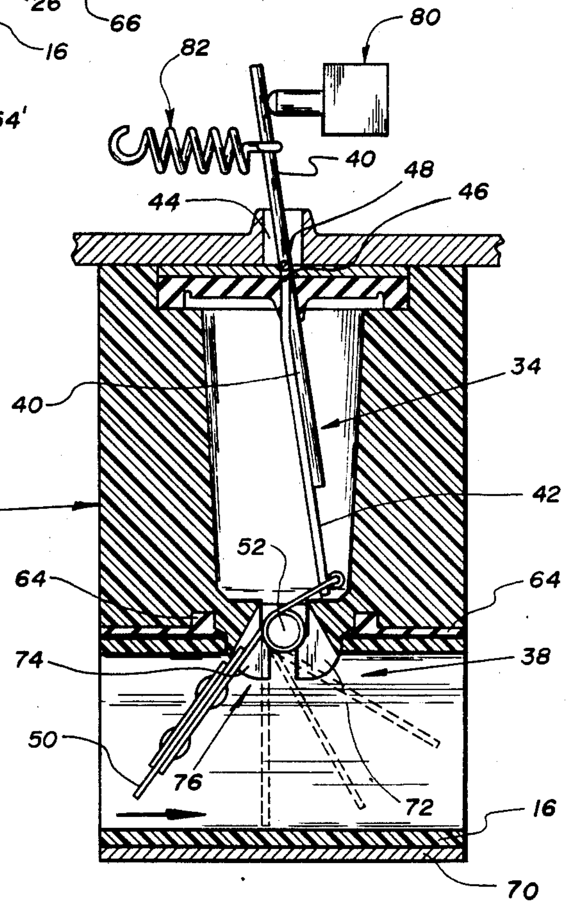
FIG. 2 is a view similar to FIG. 1 showing another side elevation of the mechanism in conjunction with the conduit.

In operation, and referring in particular to FIG. 2, with a fluid flow in the direction indicated by the arrow, paddle 50 is forced counterclockwise about the pin 52 which in turn pivots arm 42 and thus shaft 40 in a clockwise direction to close a switch means 80. When fluid flow in the conduit stops, there being no force acting on paddle 50, spring 62 causes shaft 48 to pivot counterclockwise to open the switch 80 and return the paddle 50 to its "at rest" position 64 through the coil springs 54 and 56. The fact that the actuator means and the reactor member both have a pivot point requires less force to open the switch 80.

What is claimed is:

1. A fluid flow detector assembly comprising:

(a) a saddle having a first opening and adopted for securement to a conduit having a second opening, (b) a curved adapter plate provided between said saddle and said conduit in sealing relation and having a third opening, said first, second, and third openings being in alignment, (c) a first boss means extending from said curved adapter plate, around said third opening and engaging said saddle in said second opening, (d) a second boss means including flexible fingers extending from said saddle around said first opening and engaging said conduit in said second opening to provide a seal between said saddle and said conduit, and (e) flow detection means adapted for insertion in said conduit through said first, second, and third openings, a portion of said flow detection means in contact with said flexible fingers to force said fingers into contact with said conduit, said flow detection means shiftable in response to flow flow through said conduit and including a reactor member extending into said saddle.

2. An assembly according to claim 1 further comprising a bracket securing said conduit to said saddle.

* * * * *

UNITED STATES PATENT AND TRADEMARK OFFICE
CERTIFICATE OF CORRECTION

PATENT NO. : 4,614,122

DATED : September 30, 1986

INVENTOR(S) : Brian J. Graves

It is certified that error appears in the above-identified patent and that said Letters Patent is hereby corrected as shown below:

In column 2, line 65 (the second line of claim 1), "adopted" should be --adapted--; and In column 4, line 6 (the twenty-second line of claim 1), "flow flow" should be --fluid flow--.

Signed and Sealed this

Sixth Day of December, 1988

*Attest:*

DONALD J. QUIGG

*Attesting Officer* *Commissioner of Patents and Trademarks*